(12) United States Patent
Langenbach

(10) Patent No.: US 7,666,065 B2
(45) Date of Patent: Feb. 23, 2010

(54) SHAPING APPARATUS

(76) Inventor: Michael Langenbach, 47 Lalina Avenue, Tweed Heads (AU) 2484

( * ) Notice: Subject to any disclaimer, the term of this patent is extended or adjusted under 35 U.S.C. 154(b) by 16 days.

(21) Appl. No.: 10/557,392

(22) PCT Filed: Jul. 7, 2004

(86) PCT No.: PCT/AU2004/000909

§ 371 (c)(1),
(2), (4) Date: Apr. 28, 2006

(87) PCT Pub. No.: WO2005/002787

PCT Pub. Date: Jan. 13, 2005

(65) Prior Publication Data

US 2006/0223420 A1 Oct. 5, 2006

(30) Foreign Application Priority Data

Jul. 7, 2003 (AU) ............................... 2003903468
Jul. 7, 2003 (AU) ............................... 2003903471

(51) Int. Cl.
*B24B 49/00* (2006.01)
(52) U.S. Cl. ........................................ 451/11; 451/272
(58) Field of Classification Search .................... 451/5, 451/11, 10, 272, 273, 14, 334, 364, 365, 451/411
See application file for complete search history.

(56) References Cited

U.S. PATENT DOCUMENTS

| | | | |
|---|---|---|---|
| 1,868,932 A | 7/1932 | Vernet | |
| 4,890,420 A * | 1/1990 | Azimi | 451/273 |
| 5,163,793 A | 11/1992 | Martinez | |
| 5,340,247 A * | 8/1994 | Cuneo et al. | 409/202 |
| 5,367,835 A * | 11/1994 | Turnbull | 451/5 |
| 5,524,328 A * | 6/1996 | Hardesty | 29/56.5 |
| 6,006,735 A * | 12/1999 | Schlough et al. | 125/13.01 |
| 6,162,115 A | 12/2000 | Schudrich | |
| 6,390,900 B1 * | 5/2002 | Susnjara | 451/178 |
| 2002/0161469 A1* | 10/2002 | Faulkner et al. | 700/118 |
| 2003/0003847 A1* | 1/2003 | Yi et al. | 451/9 |

FOREIGN PATENT DOCUMENTS

| | | |
|---|---|---|
| DE | 10026069 A | 12/2001 |
| EP | 0 539 633 A1 | 5/1993 |
| EP | 1043117 A | 10/2000 |
| EP | 1 175 957 A1 | 1/2001 |
| WO | 01/30540 A1 | 5/2001 |

* cited by examiner

*Primary Examiner*—Jacob K Ackun, Jr.
(74) *Attorney, Agent, or Firm*—Kenyon & Kenyon LLP

(57) ABSTRACT

A shaping apparatus for shaping a flotation core includes a worktable. At least one support is adjustably mounted on the worktable to be adjustable at least along a z-axis and configured to support the core. At least one engagement mechanism is mounted on the worktable and is displaceable relative to the worktable to engage and retain the core in position on the worktable. A gantry supports a rotary shaping machine so that a tool of the machine rotates in a y-z plane. The worktable and the gantry are displaceable relative to each other along x-, y- and z-axes. A displacement mechanism displaces the worktable and the gantry relative to each other on receipt of suitable control signals.

11 Claims, 10 Drawing Sheets

SHAPING APPARATUS

FIELD OF THE INVENTION

This invention relates to a shaping apparatus. More particularly, this invention relates to a shaping apparatus for shaping a flotation core. This invention relates further to a support structure for a shaping apparatus for shaping a flotation core and to a method of shaping a flotation core.

TERMINOLOGY

For ease of description, reference is made in this specification to an X-axis, a Y-axis and a Z-axis. The X-axis describes an axis that is parallel with a longitudinal axis of the flotation core. The Y-axis describes an axis that is parallel with a transverse axis of the flotation core. The Z-axis describes an axis that is orthogonal to both the X- and Y-axes.

BACKGROUND TO THE INVENTION

This invention is directed primarily to a shaping apparatus that is used to remove material from a flotation core that already has a rudimentary shape, such as a flotation core of a surfboard or the like. Such cores are of a non-metallic material such as an expanded synthetic material or a cellulosic material.

It is conventional to shape such cores by hand or with a rotary machine that rotates a milling-type tool in an X-Y plane. Such machines set up relatively high forces in the X-Y plane. It is therefore necessary to clamp the core firmly to prevent movement of the core during the shaping process. This clamping can result in deformation of the core, especially when shaping thinner parts of the core, such as the core for a nose of a surfboard. This deformation results in inaccuracies and poor surface finish, which is undesirable.

Flotation cores, such as those for surfboards, are shaped from cores that have a number of generic shapes depending on the type of surfboard to be manufactured. Such cores require substantial shaping prior to being coated with material such as glass fibre and resin.

Surfing has grown into a very large industry. As such, it has been difficult for many surfboard manufacturers to keep up with demand. Furthermore, the demand is associated with the desire for many different shapes.

Automated apparatus for the shaping of cores is presently available. However, Applicant has found that these apparatus take an unacceptably long time to set up. This set up time is associated with positioning and holding the core prior to carrying out the shaping operation.

The Applicant has conceived the present invention to provide a shaping apparatus that can be set up significantly faster than is achievable with presently available equipment. In particular, the Applicant has addressed both the orientation of the tool and the manner in which the core is held during the shaping process to achieve such a shaping apparatus.

Applicant has also found that it is very difficult to generate aesthetically pleasing shapes for surfboard cores. It is often desirable to reproduce a handcrafted surfboard. However, this has been found to be extremely difficult with computer-based drawing systems. Applicant has found that attempts to reproduce cores for such surfboards have generally failed to achieve a shape that looks similar to the original.

The Applicant has also conceived the present invention to develop a method that addresses this difficulty.

SUMMARY OF THE INVENTION

According to a first aspect of the invention, there is provided a shaping apparatus for shaping a flotation core, the shaping apparatus including
a worktable;
at least one support that is adjustably mounted on the worktable to be adjustable at least along a Z-axis and configured to support the core;
at least one engagement mechanism that is mounted on the worktable and is displaceable relative to the worktable to engage and retain the core in position on the worktable;
a gantry for supporting a rotary shaping machine so that a tool of the machine rotates in a Y-Z plane, the worktable and the gantry being displaceable relative to each other along X-, Y- and Z-axes; and
a displacement mechanism for displacing the worktable and the gantry relative to each other on receipt of suitable control signals.

While the apparatus finds particular application to flotation cores, it will readily be appreciated that the apparatus can be applied to articles having a similar consistency.

The worktable may include a support structure and a cradle mounted on the support structure, the cradle being displaceable relative to the support structure along the X-axis by the displacement mechanism. The cradle may include a guide that extends along the X-axis, and at least two supports that are mounted on the guide so that the supports are adjustable along both the X- and Z-axes.

The shaping apparatus may include at least two engagement mechanisms that are each a vacuum cup assembly that is mounted on the cradle. Each vacuum cup assembly may include a conduit that is connectable to a vacuum source and a vacuum cup that is mounted on the conduit to be evacuated by the vacuum source when the vacuum cup bears against the core.

The shaping apparatus may include at least two adjustment mechanisms that are mounted on the guide to be adjustable along the X-axis. Each vacuum cup assembly may be mounted on a respective adjustment mechanism that is configured so that the vacuum cup assembly is adjustable along the Z-axis.

At least one bearer may be mounted on the cradle proximate a corresponding vacuum cup assembly. The, or each, bearer may be adjustable along the Z-axis to bear against the core once the core is positioned on the supports such that the, or each, bearer inhibits deformation of the core when the vacuum cup of the corresponding vacuum assembly engages the core.

The shaping apparatus may include a stop that is adjustably positioned on the cradle to facilitate positioning the core along the X-axis.

A leveling arrangement may be mounted on the cradle and may be configured to bear against the core. The leveling arrangement may define at least two support formations that are positioned along the Y-axis so that the core is leveled about the X-axis.

The leveling arrangement may include a leveling member extending along the Y-axis and being mounted on a bar that is pivotally mounted on the cradle to be adjustable about the Y-axis and linearly adjustable along the Z-axis. Each support formation may be positioned on a respective end of the leveling member.

The shaping apparatus may include an electronic controller that is connected to the displacement mechanism so that relative movement of the gantry and the worktable is controllable according to a set of instructions. The electronic controller may be in the form of a computer-based machine in which the set of instructions are stored.

The computer-based machine may be programmable with a set of instructions to control relative movement of the worktable and the gantry according to a set of co-ordinates with values having reference points based on a position of at least one of the supports.

According to a second aspect of the invention there is provided a worktable for a shaping apparatus for shaping a flotation core, the worktable including a support structure;

at least one support that is adjustably mounted on the support structure to be adjustable at least along a Z-axis and configured to support the core; and at least one vacuum cup assembly that is mounted on the support structure and is displaceable relative to the support structure at least along the Z-axis such that a vacuum cup of the, or each, vacuum cup assembly engages the core while the core is positioned on the, or each, support.

According to a third aspect of the invention there is provided a method of shaping a flotation core, the method including the steps of:

supporting the core against gravity on supports extending from a worktable;

adjusting a position of the core relative to the worktable;

securing the core in position on the worktable; and performing a material-removing operation on the core in a Y-Z plane, while displacing the core relative to a tool along at least the X-axis.

The step of performing the material-removing operation may include the step of performing a rotary grinding operation in the Y-Z plane.

The method may include the step of displacing the tool relative to the worktable with a computer-based machine programmed with a set of instructions that are configured so that the tool is displaced along a predetermined path relative to the worktable.

The method may include the step of programming the computer with a set of instructions such that said predetermined path is defined by a set of co-ordinates having reference points based on the position of at least one of the supports.

According to a fourth aspect of the invention, there is provided a method of securing a flotation core for a shaping operation to be carried out on the core, the method including the steps of:

positioning the core on supports that are adjustable with respect to a worktable of a shaping apparatus; and subsequently displacing at least one vacuum cup assembly with respect to the worktable such that a vacuum cup of the vacuum cup assembly engages the core.

According to a fifth aspect of the invention there is provided a method of generating a shape for a flotation core, the method including the steps of:

generating a representation of the shape for the work piece on an image surface;

projecting an image template on the image surface with a computer-driven projection device;

generating a database of coordinates on a computer that drives the projection device such that the database of coordinates maps the representation; and communicating the database of coordinates to a control system of a shaping apparatus.

The method may include the step of storing the database of coordinates in a data storage device.

According to a sixth aspect of the invention, there is provided an apparatus for generating a shape for a flotation core, the apparatus comprising a computer-driven projection device for displaying an image template on an image surface that carries a representation of the shape of the flotation core;

a computer that is connected to the projection device to permit an operator to generate a database of coordinates that maps the representation; and a control system that is capable of being operatively connected to a shaping apparatus to control operation of the shaping apparatus through an application of the database of coordinates.

It will be appreciated that the control system may be defined by a suitable program that is executable by the computer.

The invention is now described, by way of example, with reference to the accompanying drawings. The following description is intended to describe particular examples of the invention to a person of ordinary skill in the field. As such, the following description is not intended to limit the broad scope of the invention as set out in the preceding paragraphs.

DETAILED DESCRIPTION OF THE DRAWINGS

Figure 1:
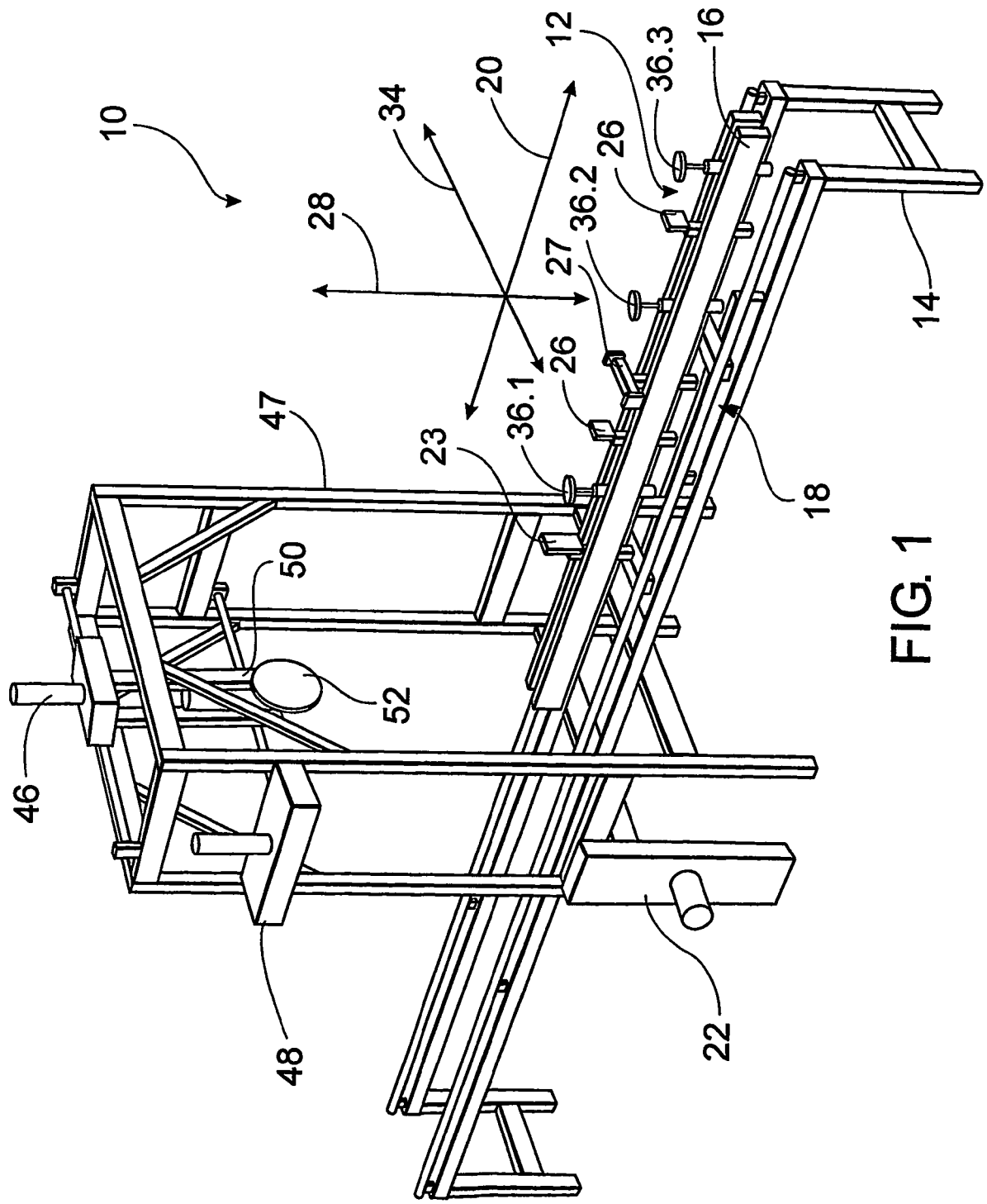
FIG. 1 shows a shaping apparatus, in accordance with the invention, for shaping flotation cores.
Figure 2:
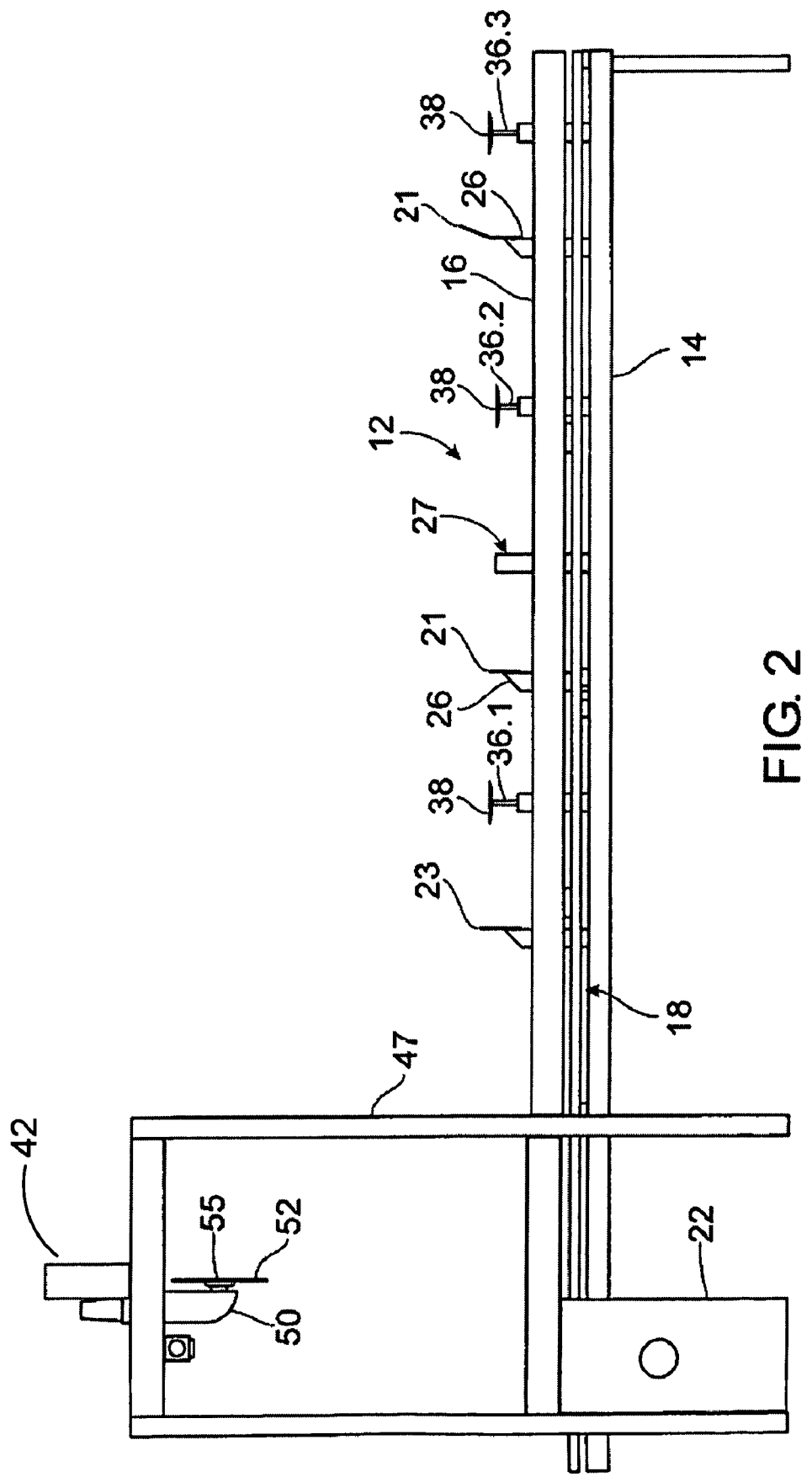
FIG. 2 shows a side view of a worktable, also in accordance with the invention, of the apparatus.
Figure 3:
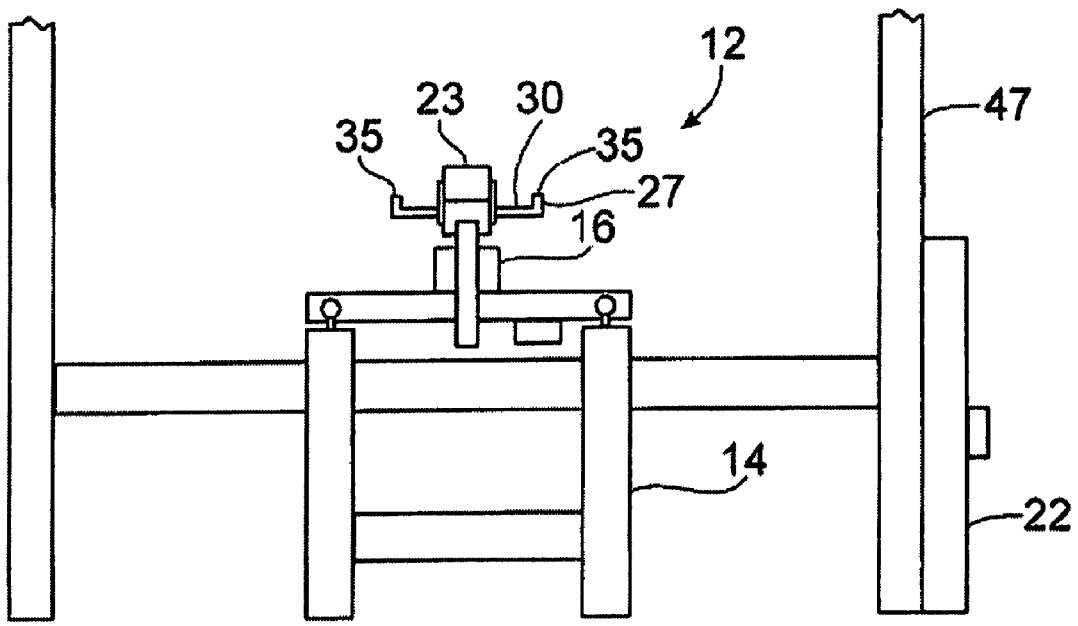
FIG. 3 shows a front view of the worktable.
Figure 4:
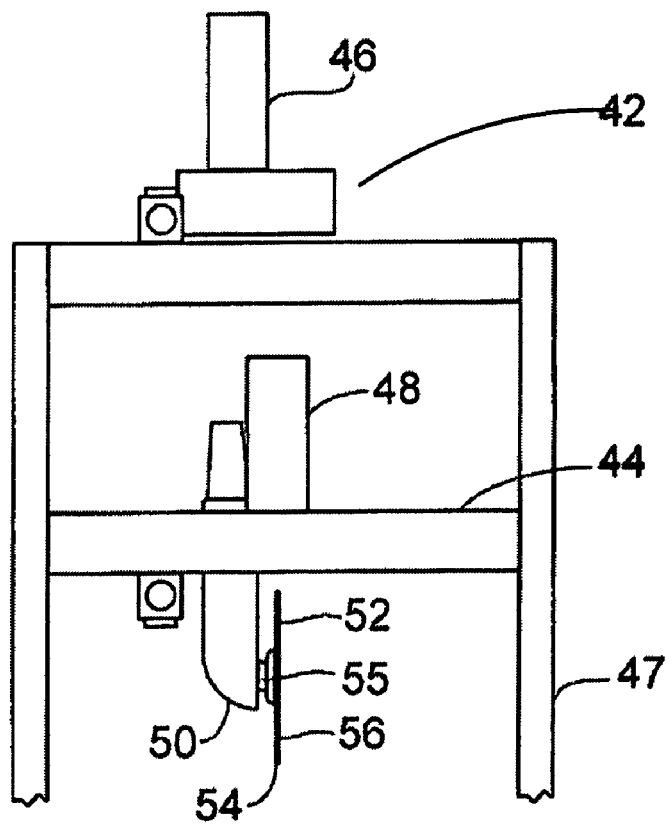
FIG. 4 shows a side view of a gantry of the shaping apparatus.
Figure 5:
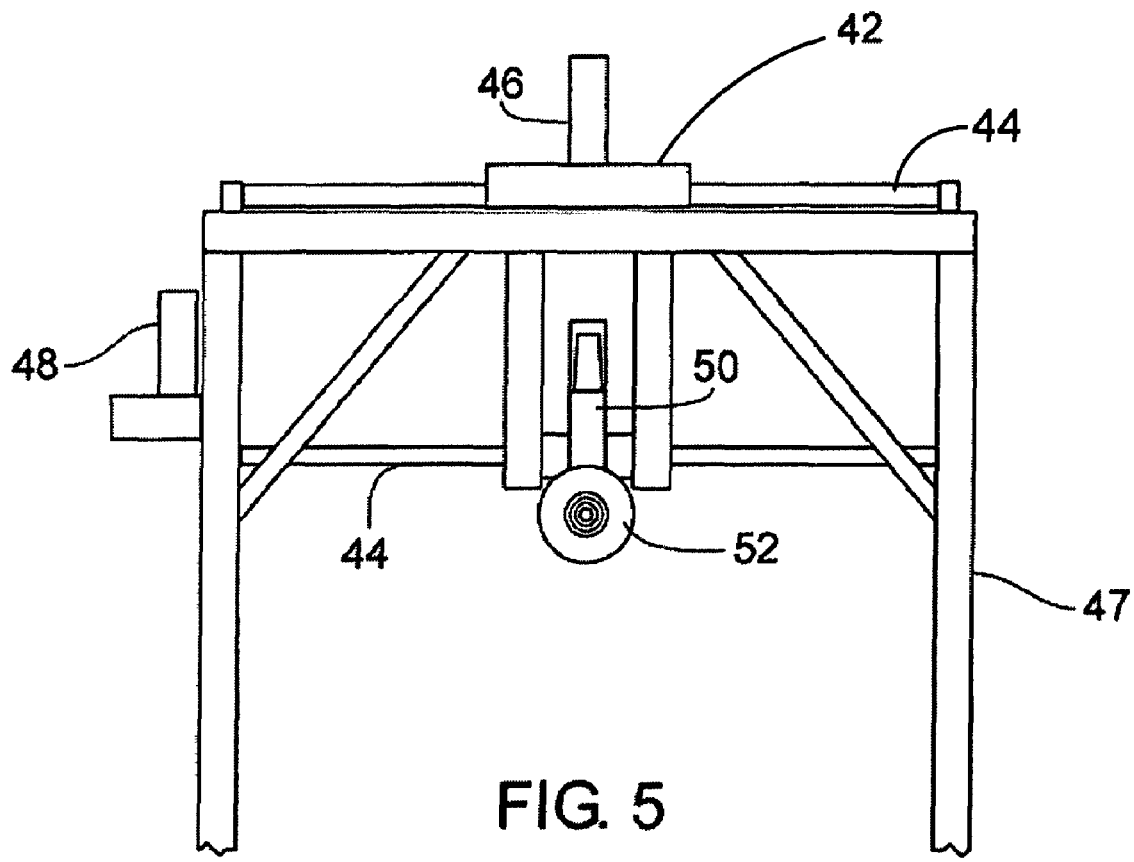
FIG. 5 shows a front view of the gantry.
Figure 6:
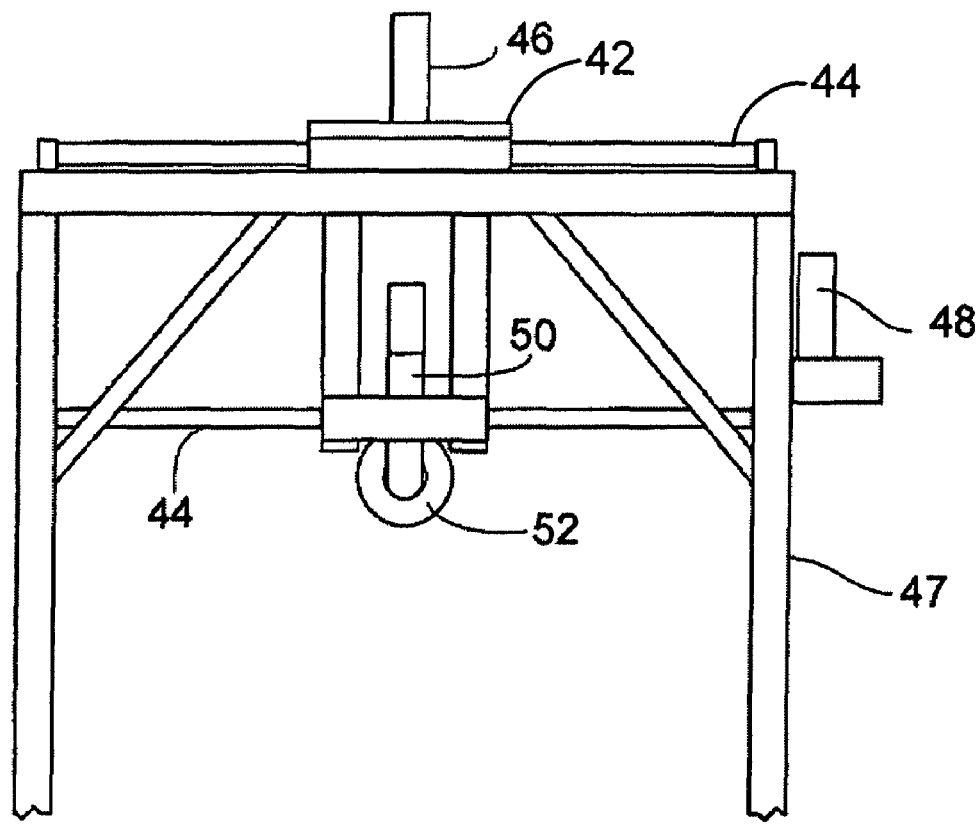
FIG. 6 shows a rear view of the gantry.

In the drawings, reference numeral 10 generally indicates a shaping apparatus in accordance with the invention, for shaping a flotation core 11.

The shaping apparatus 10 includes a worktable 12, also in accordance with the invention. The worktable 12 includes a support structure 14 that is mounted on a substrate.

The worktable 12 includes a cradle 16 that is mounted on the support structure 14.

The cradle 16 and the support structure 14 define complementary mounting formations 18 that are configured so that the cradle 16 is displaceable with respect to the support framework 14 in the direction of an X-axis indicated at 20. A Y-axis is indicated at 34 and a Z-axis is indicated at 28.

A drive mechanism 22 is mounted on the support framework 14 and is engageable with the cradle 16 to displace the cradle 16 along the X-axis. The drive mechanism 22 is referred to further as the X drive mechanism 22.

Figure 7:
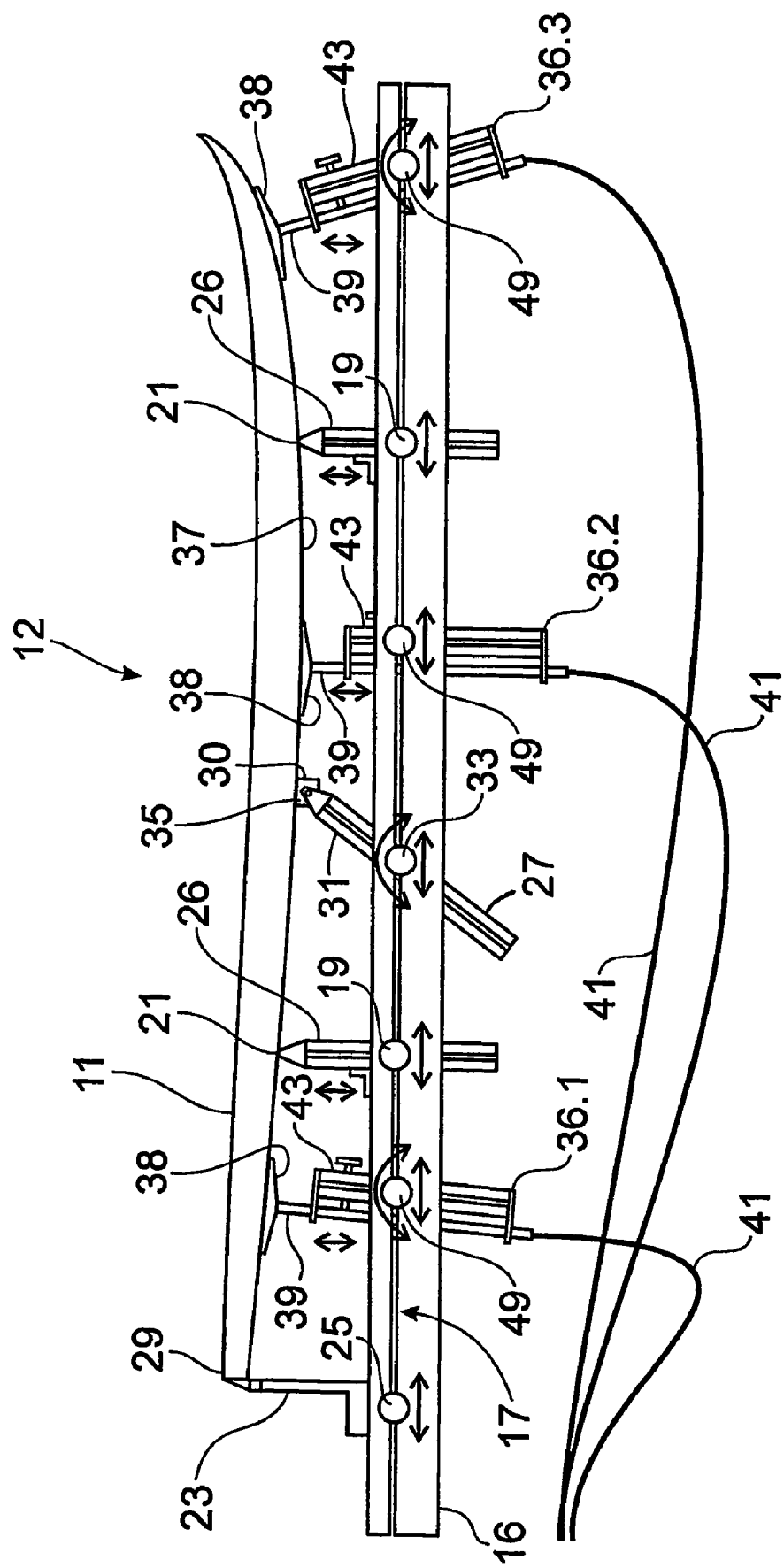
FIG. 7 shows a further side view of the worktable of the apparatus.

A pair of supports 26 are positioned on the cradle 16 and spaced along the X-axis 20. As shown in FIG. 7, the cradle 16 defines a slot 17 that extends along the X-axis 20. Each support 26 is fastened to a pin 19 that is slidably positioned in the slot 17. Thus, each support member 26 is adjustable along the X-axis 20. The support members 26 each define a support point 21 on which the core 11 is supported, with an underneath surface 37 of the core 11 bearing against the support points 21.

A stop 23 is mounted on the cradle 16. The stop 23 is fastened to a pin 25 that is slidably positioned in the slot 17. Thus, the stop 23 is adjustable along the X-axis 20. The stop 23 is positioned so that an end 29 of the core 11 can abut the stop 23 to facilitate positioning of the core 11 along the X-axis 20.

A leveling arrangement 27 is mounted on the cradle 16. The leveling arrangement 27 includes a leveling member 30. The leveling member 30 is elongate and is positioned along the Y-axis 34. A pair of spaced formations 35 are positioned on the leveling member 30 to bear against the underneath surface 37 of the core 11.

The leveling member 30 is pivotally mounted on an upper end of a bar 31 to be rotatable in a plane defined by the X- and Z-axes (the X-Z plane) with respect to the bar 31. A lower end of the bar 31 is fastened to a pin 33 that is slidably mounted in the slot 17. Thus, the bar 31 and the leveling member 32 are adjustable along the X-axis and in the X-Z plane. It will therefore be appreciated that the bar 31 and the leveling member 32 serve to level the core 11 prior to the shaping operation. Furthermore, the leveling member 32 serves to inhibit angular displacement of the core 11 in a plane defined by the Y- and Z-axes (the Y-Z plane). Once the core 11 is leveled, the bar 31 is clamped to the cradle 16 in that position.

The worktable 12 includes three engagement mechanisms devices in the form of vacuum cup assemblies 36. One of the vacuum cup assemblies 36.1 is interposed between the stop 23 and a support 26. A second vacuum cup assembly 36.2 is interposed between the leveling member 30 and the other support 26. A third vacuum cup assembly 36.3 is interposed between the other support member 26 and an end of the core 11.

Each vacuum cup assembly 36 includes a vacuum cup 38 that is positioned on a conduit in the form of a tube 39 and is in fluid communication with the tube 39. Each tube 39 is in fluid communication with a vacuum pump (not shown) via a gas pipe 41. Each tube 39 is mounted on an adjustment device 43 that is mounted on the cradle 16. Each tube 39 is slidably adjustable relative to the adjustment device 43 to permit adjustment of each vacuum cup 38 along the Z-axis 28.

Each adjustment device 43 is rotatably mounted on a pin 49 to permit angular adjustment of the adjustment device 43 and thus the tube 39 and vacuum cup 38 relative to the cradle 16. The adjustment device 43 can thus be freely moved and angled along the X-axis 20 to accommodate different core shapes and sizes. The tube 39 can freely move along the Z-axis 28. After each vacuum cup 38 is positioned, its respective adjustment device 43 is clamped to the cradle 16. The vacuum cups 38 are then evacuated to engage the core 11. The tubes 39 are then clamped to their associated adjustment devices 43. This ensures that the core 11 is held in position without deformation.

The pin 49 is slidably mounted in the slot 17 so that each adjustment device 43 and thus vacuum cup 38 can be adjusted along the X-axis 20.

In use, the support members 26, the stop 23 and the leveling member 30 are used to orientate the core 11 into a position suitable for the shaping operation. The vacuum cups 38 are then adjusted with the adjustment devices 43 until the vacuum cups 38 bear against the underneath surface 37 of the core 11. The vacuum pump is then used to generate a vacuum within each vacuum cup 38 so that the vacuum cups 38 engage the underneath surface 37 of the core 11 to hold the core 11 in position during the shaping operation. The stop 23 is displaced from the core 11 prior to the shaping operation. The upper side and the outside of the core 11 can thus be accessed without restriction.

Figure 8:
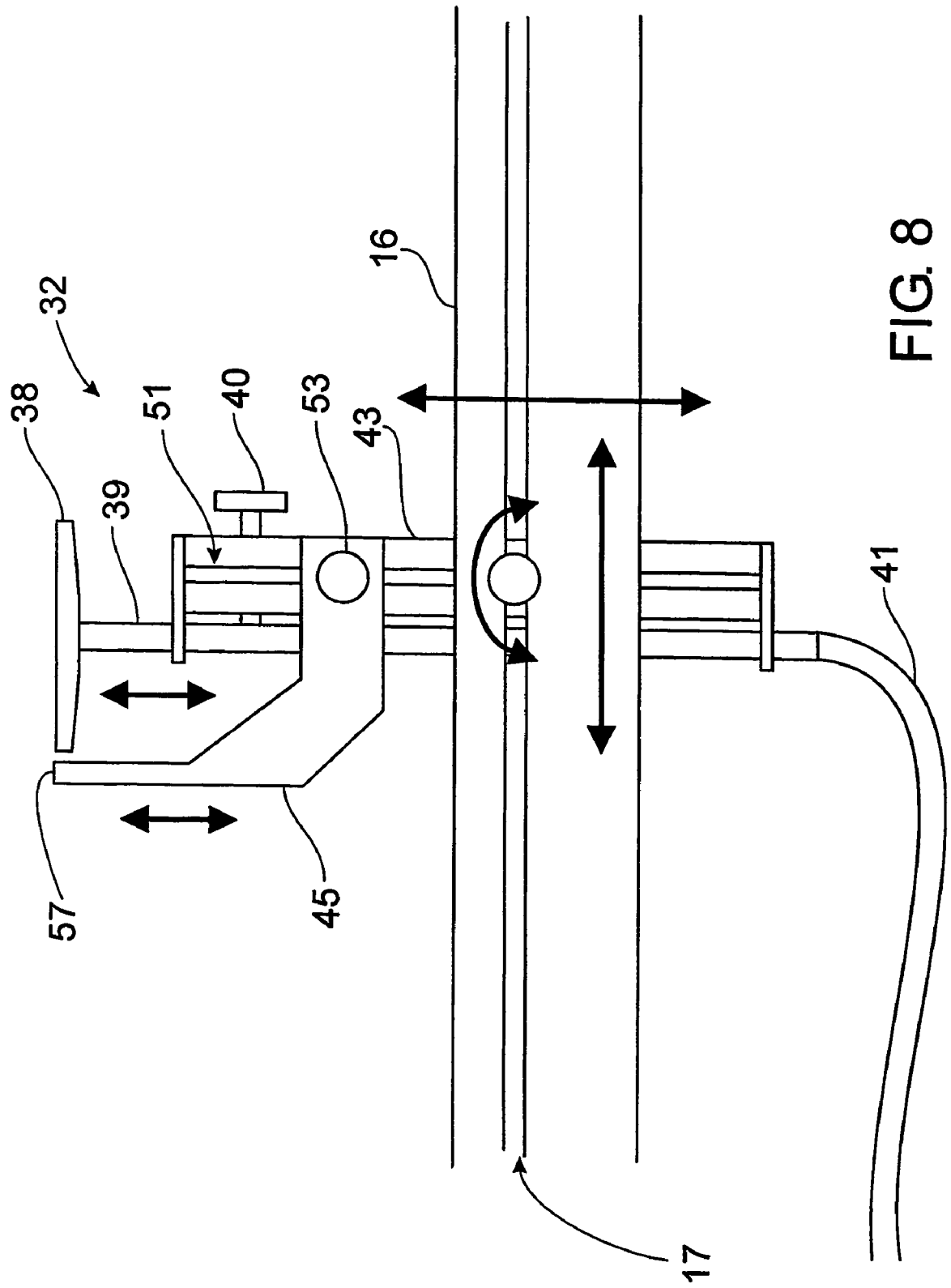
FIG. 8 shows an example of a vacuum assembly for the worktable of the apparatus.

In FIG. 8, reference numeral 32 generally indicates a further example of a vacuum cup assembly for the worktable 12. With reference to preceding drawings, like reference numerals refer to like parts, unless otherwise specified.

The assembly 32 shows a fastening device 40 that is engageable with the tube 39 to fasten the vacuum cup 38 in position once the vacuum cup 38 has engaged the core 11.

A bearer 45 is mounted on the adjustment device 43 to be adjustable along the Z-axis. The adjustment device defines a slot 51. A pin 53 extends through the bearer 45 and the adjustment device 43 to permit the bearer 45 to be fastened in position.

The bearer 45 defines a bearing surface 57 which supports the core 11 in a region proximate the core 11. Thus, once the core 11 is positioned on the bearing surface 57, the proximate vacuum cup 38 is engaged with the core 11.

The assembly 32 is used in regions where the core 11 is relatively thin, such as a nose of the core 11, once an underneath surface of the core 11 has been ground. Those skilled in the art of core or board shaping will understand that the core 11 is readily deformable in such regions. The bearer 45 serves to inhibit such deformation when the vacuum cup 38 is applied to the core 11. This facilitates accurate shaping of the core 11 in thinner regions.

The apparatus 10 includes a gantry 42 that is positioned above the worktable 12. The gantry 42 is supported on a transom 44 that is supported above the worktable 12 on a box frame 47. The box frame 47 is mounted on the substrate.

A Y-drive mechanism 46 is mounted on the transom 44 to facilitate displacement of the gantry 42 in the direction of the Y-axis 34. The gantry 42 also includes a Z-drive mechanism 48 that facilitates displacement of the gantry 42 in the direction of the Z-axis 28. It will thus be appreciated that when the core 11 is in position, the gantry 42 can be displaced in the direction of any of the Y- and Z-axes 34, 28.

A rotary shaping machine 50 is mounted on the gantry 42. The rotary shaping machine 50 includes a shaping disk 52. The shaping disk 52 has a cutting periphery 54 and a grinding surface 56. The gantry 42 is configured so that an output shaft 55 of the machine 50 extends along the X-axis 20. Thus, the shaping disk 52 is oriented to rotate in the Y-Z plane. When the disk 52 then moves in the direction of the X-axis 20, the disk 52 removes material from the core 11 in the Y-Z plane. In particular, the cutting periphery 54 is able to cut into the core 11 to a desired depth and then to grind away core material as the disk 52 is displaced along the X-axis 20.

It will be appreciated that, by controlling operation of the X drive mechanism 22, the Y drive mechanism 46 and the Z drive mechanism 48, a desired core shape can be achieved.

The reason for this is that a desired shape of the core can be represented by one or more functions where X, Y and Z coordinates are variables of the function/s. The support points 21 of the support members 26 then define one or more points of reference for the functions. The function/s are used to relate a series of X, Y and Z coordinates defining a pre-shaped surface of the core 11 with a series of X, Y and Z coordinates defining a shaped surface of the core 11.

Figure 9:
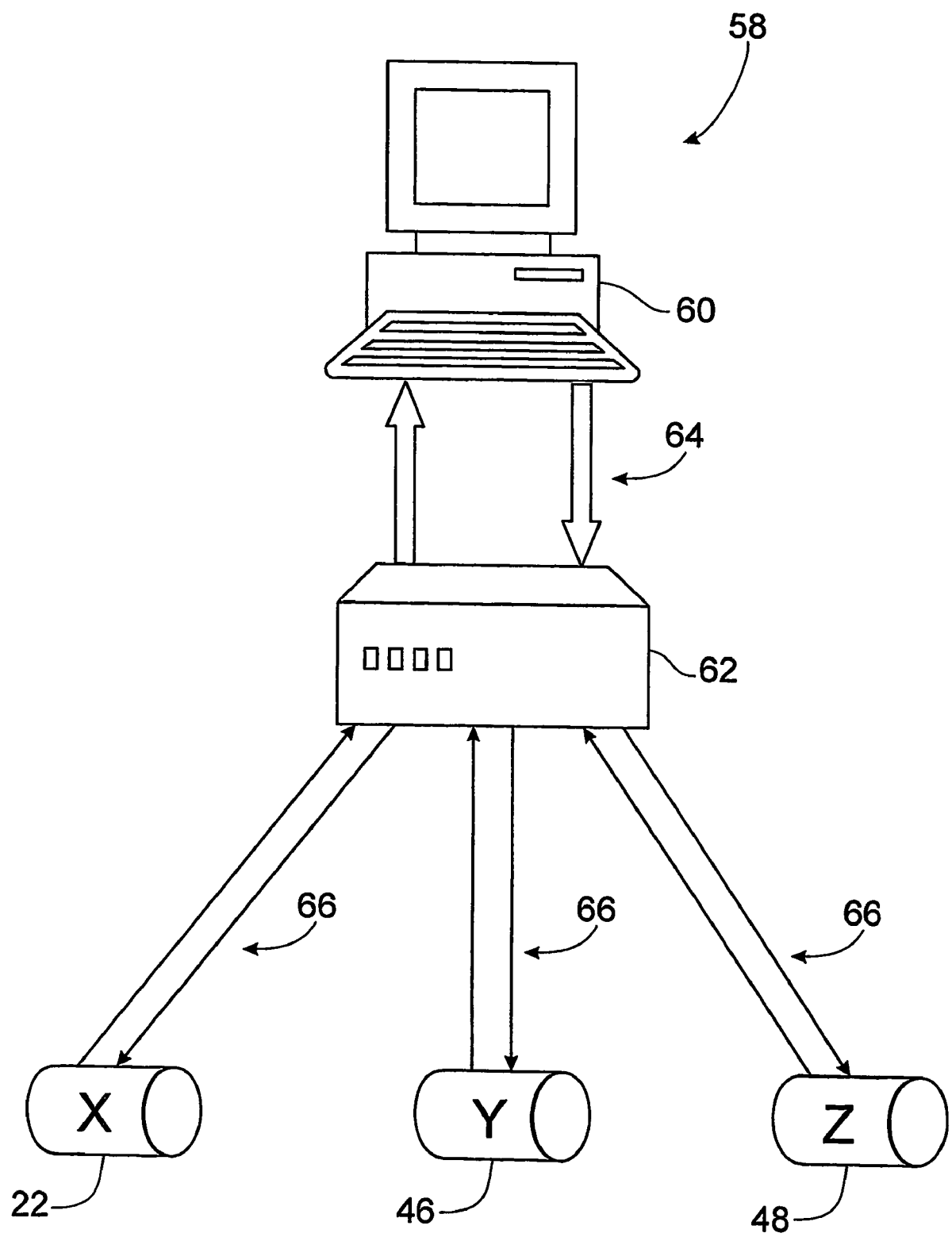
FIG. 9 shows a schematic layout of a control system of the shaping apparatus.

In FIG. 9, there is shown, schematically, a control system 58 of the apparatus 10. The control system 58 includes a computer workstation 60. The workstation 60 is programmed with algorithms that define said function/s. The control system 58 is then used to communicate with a drive controller 62 via a suitable feedback interface 64.

The drive controller 62 is operatively connected to each of the X, Y and Z drive mechanisms 22, 46, 28 with suitable feedback interfaces 66.

Thus, by providing the workstation 60 with a suitable program, a user can cause the shaping disk 52 to move through predetermined paths to shape the core 11.

Figure 10:
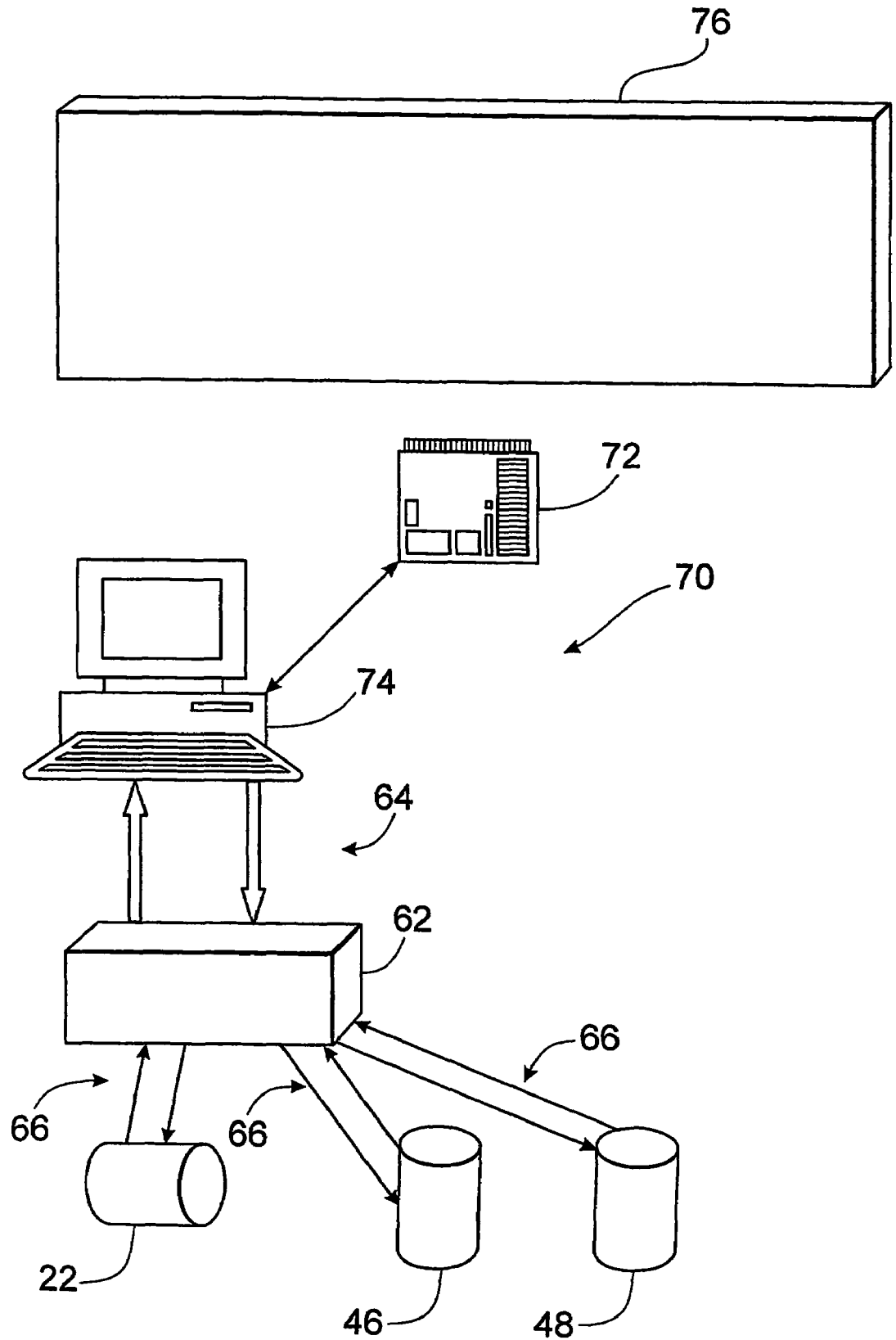
FIG. 10 shows a schematic diagram of an apparatus, in accordance with the invention, for generating a shape for a work piece, in accordance with a method of the invention.

In FIG. 10, reference numeral 70 generally indicates an apparatus, In accordance with the invention, for generating a shape for a workpiece, in accordance with a method of the invention. With reference to FIGS. 1 to 9, like reference numerals refer to like parts, unless otherwise specified.

The apparatus 70 includes a computer-driven projection device in the form of a data projector 72. The data projector 72 is connected to a computer 74 to be driven by the computer 74. The data projector 72 is capable of projecting an image template on an image surface in the form of a screen 76.

The computer 74 is programmed with a graphics software product. As is known, such products digitise images into data that represents coordinates of a particular representation. Thus, the computer 74 can be operated to generate an image template on the screen 76, via the data projector 72.

In use, an operator physically generates a profile of a desired shape on the screen 76. In the case where the apparatus 70 is to be used to generate a shape for a flotation core, the profile can be in the form of a desired surfboard profile. In this case, the profile can be generated by positioning a surfboard or surfboard core on the screen 76 and tracing the required profile with a suitable marker. Instead, the desired profile can simply be drawn on the screen 76.

The image template is then projected on to the screen 76 so that the drawn profile remains visible. The image template is calibrated such that the image template and the drawn profile are represented on a 1:1 scale.

The operator uses the graphics software and the computer 74 to generate a projected image that corresponds to the drawn profile. It will be appreciated that, in doing so, the operator effectively generates a set of coordinates that represent the drawn profile.

The computer 74 is connected to the drive controller 62 that is configured to use the coordinates to control operation of the X-, Y-, and Z- drive mechanisms 22, 46 and 48. It will therefore be appreciated that by using the apparatus 10 and 70 in combination, an operator can readily replicate an existing surfboard core. Furthermore, the apparatus 70 permits an operator to generate and store a set of coordinates that represents a particular surfboard core such that the surfboard core can be replicated any number of times using the apparatus 10.

In the surfboard industry, many shapers use experience and artistic talent to generate surfboard cores. However, it will be appreciated that generating surfboard cores in this manner can be both costly and time-consuming. The apparatus 70 allows replication of surfboard cores at a low cost and at a relatively high rate.

The apparatus 70 permits an operator to generate an image on the same scale as the drawn profile. It will be appreciated that this allows the operator to be more accurate and to avoid errors which would be magnified when an image is created on a computer screen.

Figure 11:
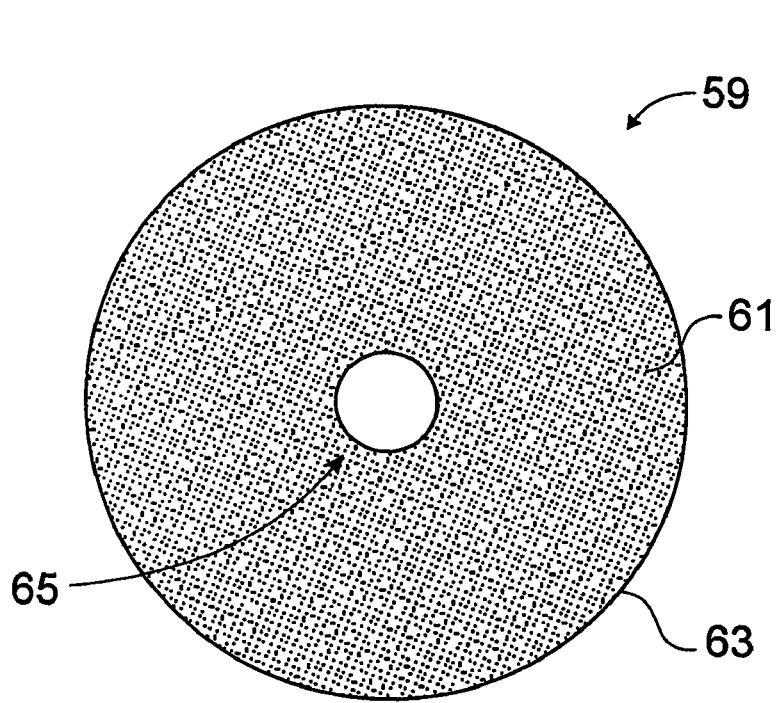
FIG. 11 shows a side view of a first example of a suitable shaping tool for use with the shaping apparatus.
Figure 12:
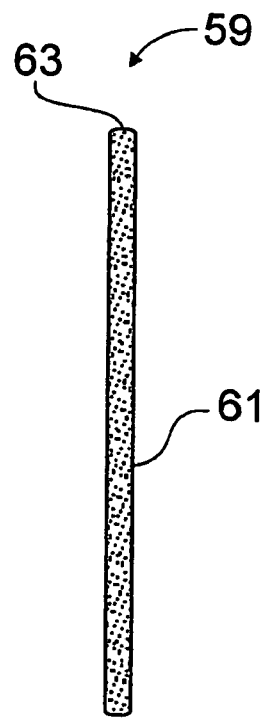
FIG. 12 shows a front view of the shaping tool of FIG. 11.

In FIGS. 11 and 12, reference numeral 59 generally indicates a first example of a shaping tool or disk for use with the apparatus 10.

The disk 59 includes a body of suitable tool steel. The body is coated with a layer of abrasive carbide 61. In this particular example, a peripheral edge 63 of the body is also coated with the abrasive carbide 61. This allows the disk 59 initially to cut into the core 11 and then to move along a predetermined path, while removing core material. Applicant has found that a particularly suitable disk is one similar to that fabricated for the grinding of used tires for re-cycling.

Conventionally, the disk 59 has an opening 65 to permit the disk 59 to be fastened to the output shaft 55 of the shaping machine 50.

Figure 13:
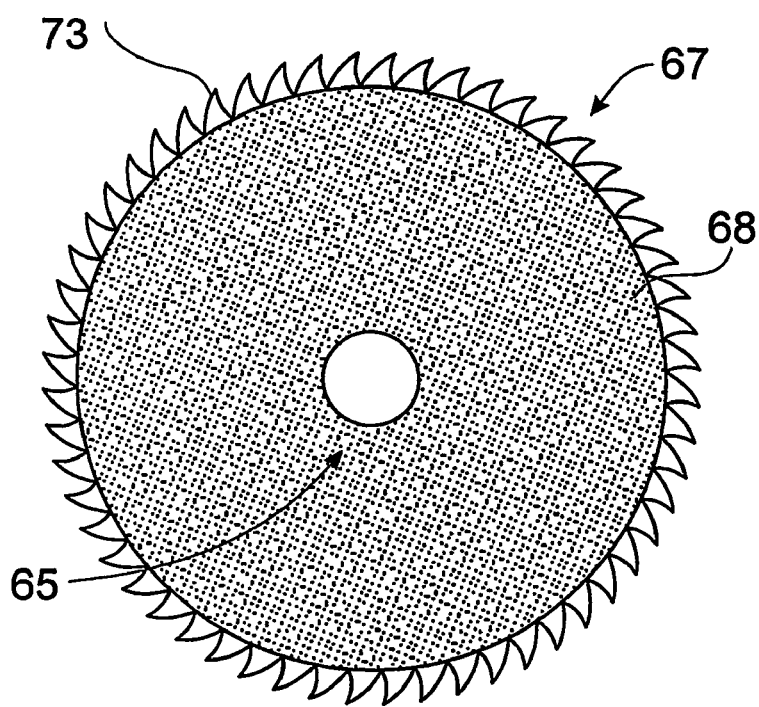
FIG. 13 shows a side view of a second example of a suitable shaping tool for use with the shaping apparatus.
Figure 14:
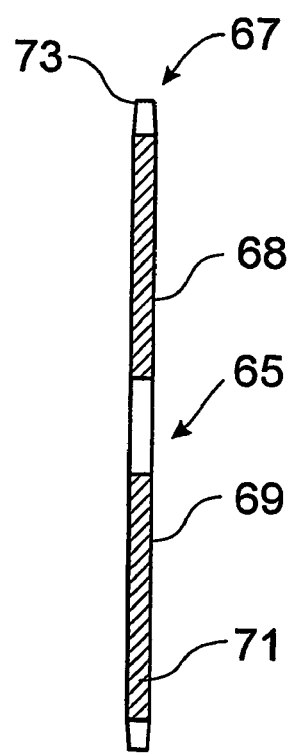
FIG. 14 shows a sectioned front view of the shaping tool of FIG. 13.

In FIGS. 13 and 14, reference numeral 67 generally Indicates a second example of a shaping tool or disk for use with the apparatus 10. With reference to FIGS. 11 and 12, like reference numerals refer to like parts, unless otherwise specified.

A layer 68 of carborundum abrasive is affixed to each side 69 of a body 71 of the disk 67. Cutting teeth 73 are defined about a periphery of the body 71. The cutting teeth 73 permit the disk 67 to cut into the core 11, while the layer 68 facilitates the removal of the core material. The layer 68 can be defined by conventional sandpaper or the like.

Figure 15:
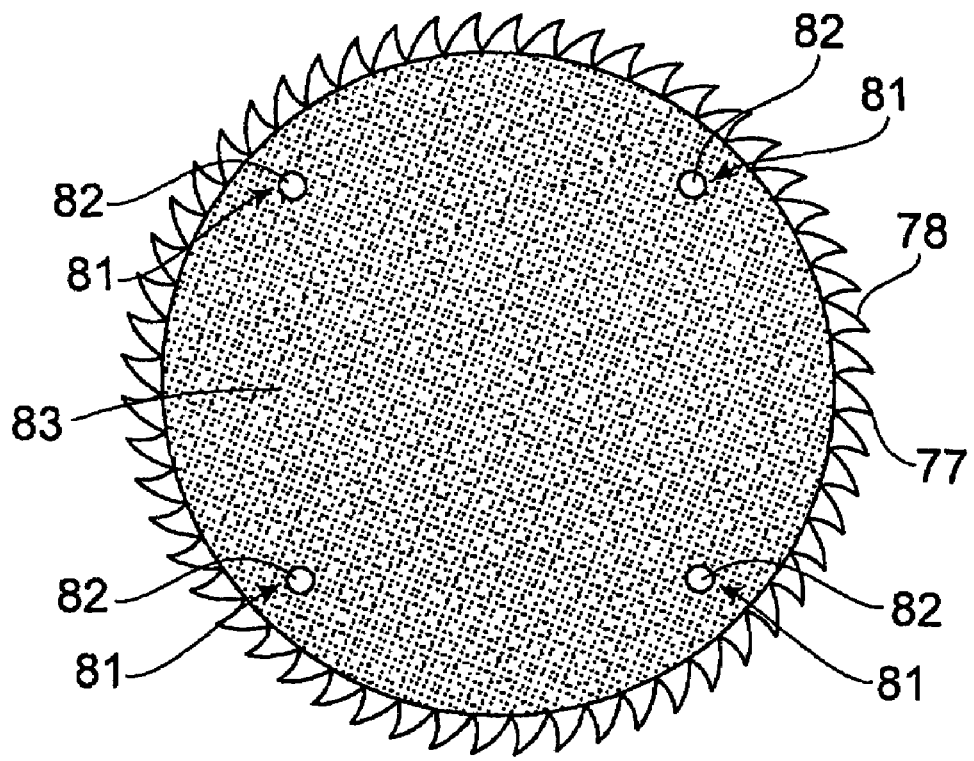
FIG. 15 shows a side view of a third example of a suitable shaping tool for use with the shaping apparatus.
Figure 16:
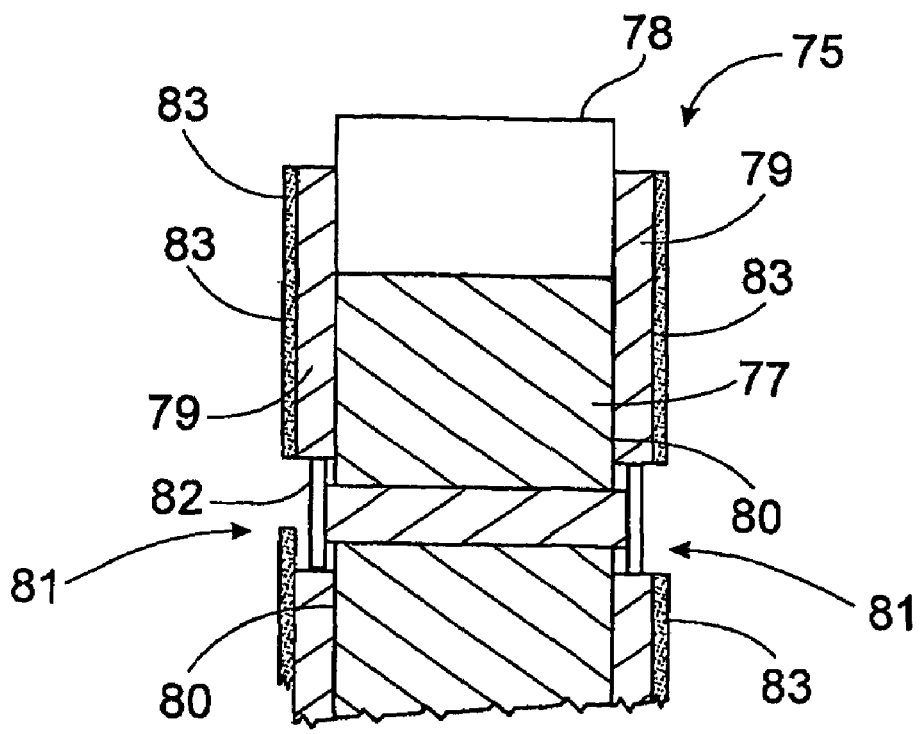
FIG. 16 shows a sectioned front view of part of the shaping tool of FIG. 15.

In FIGS. 15 and 16, reference numeral 75 generally indicates a third example of a shaping tool or disk for use with the apparatus 10. With reference to FIGS. 11 to 14, like reference numerals refer to like parts, unless otherwise specified.

The disk 75 includes a disk-shaped body with a cutting formation on its periphery, which defines a saw blade 77. The cutting formation is in the form of a series of cutting teeth 78 having a negative rake. The saw blade 77 is of aluminium.

A tin carrier 79 is clamped to each of a pair of opposed planar faces 80 of the saw blade 77. An abrasive layer 83 of silicon carbide is fixed to each carrier 79. Each carrier 79 and the blade 77 have a number of sets of complementary openings 81 defined therein. A clamping means in the form of a shanked fastener 82 is received through each set of complementary openings 81. The openings 81 are countersunk so that the fasteners 82 do not interfere with operation of the carrier 79.

It will be appreciated that many other ways of attaching the carriers 79 to the blade 77 are feasible. For example, a locking mechanism could be provided whereby the carriers 79 could be locked rotationally with respect to the blade 77. Another possibility would be the incorporation of a threaded connector on the carriers 79 so that the carriers 79 could be screwed to the blade 77.

The process of providing the carriers 79 with the layer 83 of silicon carbide requires the generation of a substantial amount of heat. Thus, the Applicant has avoided possible weakening of the blade 77 through annealing by applying the layer 83 to the carriers 79 rather than directly to the blade 77.

It is to be appreciated that the silicon carbide can be applied directly to the blade 77 in certain cases. Applicant envisages that such blades will be easy to replace and of a relatively low cost.

As is known, a core often incorporates a central reinforcing strip or stringer that is positioned on an axis of symmetry of the core 11. The reinforcing strip is usually of wood. In all the examples of the shaping tool, the Applicant has selected the configuration to prevent shattering of the timber reinforcing strip or stringer.

A particular advantage of using the shaping tool with the apparatus 10 is that the forces generated in the direction of the Y-axis are relatively low. On the other hand, when milling devices are used, a significant amount of torque can be generated in the X-Y plane. Thus, with the apparatus 10, the core 11 can be held less firmly with the risk of deformation through such holding being reduced.

Applicant believes that this invention provides a particular advantage in that the positioning of the core 11 can be carried out quickly and efficiently. Furthermore, the worktable 12 allows the core 11 to be held in a position in which a substantial overhang of the sides and ends of the core 11 is created. This allows the shaping tool to traverse fully the sides and ends of the core 11 allowing them to be shaped without interruption together with the rest of the core 11. It will be appreciated that this saves a significant amount of time and enhances the accuracy of the shaping operation.

The provision of the bearer 45 permits the core 11 to be held in relatively thin regions without being deformed during the shaping operation.

Furthermore, the invention permits a manufacturer to maintain a number of different programs that correspond to cores of different shapes. It follows that a change of shape is very simple and does not require the excessive adjustment required with a pantograph or the experience and manual dexterity when the core is shaped by hand. Still further, the invention obviates the need for a manufacturer to employ skilled board shapers who are difficult to source. Rather, it is possible for a basic technician to make use of the invention once he or she has become familiar with the associated software.

Surfing is no longer a pastime for only a few skilled individuals who seek handmade boards. Rather, the industry has become extremely large and it is no longer possible to provide handmade or semi-handmade surfboards to meet the present demand. Furthermore, the industry has become increasingly competitive and Applicant believes that this invention provides a means whereby a manufacturer can achieve a significant advantage.

The embodiments of the invention described herein are provided for the purposes of explaining the principles thereof, and are not to be considered as limiting or restricting the invention since many modifications may be made by the exercise of skill in the art without departing from the scope of the invention.

The invention is defined in the following claims:

1. A shaping apparatus for shaping a flotation core, the shaping apparatus including
   a worktable;
   a cradle mounted on the worktable, the cradle including:
      at least one support that is adjustably mounted on the cradle to be adjustable at least along a Z-axis and configured to support the core, said at least one support configured to inhibit deformation of the core when the at least one engagement mechanism engages said core; and
      a leveling arrangement mounted on the cradle for bearing against the core, the leveling arrangement defining at least two support formations that are positioned along the Y-axis so that the core is leveled about the X-axis;
   a gantry for supporting a rotary shaping machine so that a tool of the machine rotates in a Y-Z plane, the worktable and the gantry being displaceable relative to each other along X-, Y- and Z-axes; and
   a displacement mechanism for displacing the worktable and the gantry relative to each other on receipt of suitable control signals.

2. A shaping apparatus as claimed in claim 1, in which the worktable includes a support structure with the cradle mounted on the support structure, the cradle being displaceable relative to the support structure along the X-axis by the displacement mechanism.

3. A shaping apparatus as claimed in claim 2, in which the cradle includes a guide that extends along the X-axis, and at least two supports that are mounted on the guide so that the supports are adjustable along both the X- and Z-axes.

4. A shaping apparatus as claimed in claim 2, which includes at least two engagement mechanisms that are each a vacuum cup assembly that is mounted on the cradle, each vacuum cup assembly including a conduit that is connectable to a vacuum source and a vacuum cup that is mounted on the conduit to be evacuated by the vacuum source when the vacuum cup bears against the core.

5. A shaping apparatus as claimed in claim 4, which includes at least two adjustment mechanisms that are mounted on the guide to be adjustable along the X-axis, each vacuum cup assembly being mounted on a respective adjustment mechanism that is configured so that the vacuum cup assembly is adjustable along the Z-axis.

6. A shaping apparatus as claimed in claim 2, which includes a stop that is adjustably positioned on the cradle to facilitate positioning the core along the X-axis.

7. A shaping apparatus as claimed in claim 2, in which the leveling arrangement includes a leveling member extending along the Y-axis and being mounted on a bar that is mounted on the cradle to be adjustable about the Y-axis and linearly adjustable along the Z-axis, each support formation being positioned on a respective end of the leveling member.

8. A shaping apparatus as claimed in claim 2, which includes an electronic controller that is connected to the displacement mechanism to control relative displacement of the gantry and the worktable according to a set of instructions.

9. A shaping apparatus as claimed in claim 8, in which the electronic controller is a computer-based machine that is programmable with the set of instructions.

10. A shaping apparatus as claimed in claim 9, in which the computer-based machine is programmable with the set of instructions to control relative movement of the worktable and the gantry according to a set of co-ordinates with values having reference points based on a position of at least one of the supports.

11. A shaping apparatus as claimed in claim 1, wherein the at least one support is configured to inhibit deformation of the core by being adjustable along the X- and Z-axes and by defining support points for supporting deformable regions of the core.

* * * * *